Figure 1:
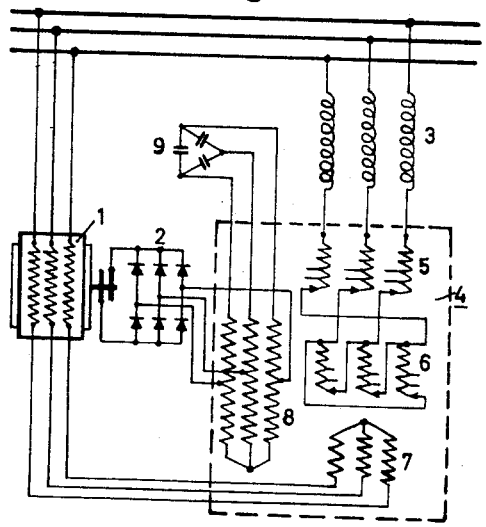

Feb. 26, 1957  H. HARZ  2,783,432
APPARATUS FOR EXCITING SYNCHRONOUS
MACHINES THROUGH RECTIFIERS
Filed Oct. 22, 1954

Inventor:
Hermann Harz

United States Patent Office 2,783,432
Patented Feb. 26, 1957

2,783,432

APPARATUS FOR EXCITING SYNCHRONOUS MACHINES THROUGH RECTIFIERS

Hermann Harz, Berlin-Siemensstadt, Germany, assignor to Siemens-Schuckertwerke Aktiengesellschaft, Berlin-Siemensstadt and Erlangen, Germany, a German corporation Application October 22, 1954, Serial No. 464,140

Claims priority, application Germany October 30, 1953

15 Claims. (Cl. 322—25)

My invention relates to a field-excitation system for synchronous dynamoelectric machines, particularly multiphase alternators.

For maintaining the multiphase output voltage of such synchronous machines at a constant value, the direct-current field of the machine may be excited from a rectifier energized through a transformer from the alternating-current line, the transformer being excited on the one hand by the load current of the machine and on the other hand, through reactive impedances such as reactor coils or capacitors, from the voltage of the synchronous machine. In such a system, the excitation ampere turns of the rectifier transformer excited through the reactances are approximately 90° phase displaced with respect to the terminal voltage of the machine; and the system has the disadvantage that the voltage of the synchronous machine, although remaining constant with increasing load, is undesirably varied with variation of the power factor ($\cos \varphi$) of the machine.

It is a principal object of my invention to eliminate this disadvantage.

To this end, I provide a multiphase synchronous machine with a regulated field-excitation system of the above-mentioned type in which the field current is supplied through a rectifier from a multiphase current transformer whose primary windings are supplied with superimposed multiphase currents of which one is proportional to the load current of the machine, while the other is supplied from the multiphase voltage synchronous machine through a reactive impedance. According to the invention, in order to produce constant voltage of the synchronous machine for various power factors ($\cos \varphi$) of the load, multiphase primary windings of the current transformer, energized by the respective, different multiphase currents above mentioned, are given respectively different multiphase circuit connections. As a result, the excitation ampere turns of the rectifier transformer originating from the voltage of the synchronous machine do not lag the terminal voltage of the machine exactly by 90° but are superimposed upon the load-dependent excitation ampere turns of the transformer at such a phase angle that the sum of the two excitation currents corresponds substantially to the desired datum value of the machine-field excitation current between two or more values of the power factor. This can be achieved, for example, by having the load-independent excitation ampere turns of the transformer lag the terminal voltage of the machine by more or less than 90°. For this purpose, two series connected groups of primary windings of the rectifier transformer may be energized by the load-dependent and the voltage-dependent excitation respectively, one of the winding groups having an open circuit arrangement while the other is delta or zigzag connected, and both are connected with each other so that the respective components of excitation current in the two groups of windings are 90° phase displaced relative to each other. By means of winding taps on both groups of primary transformer windings, the sum of these current components can be given any desired magnitude and phase angle.

Figure 3:
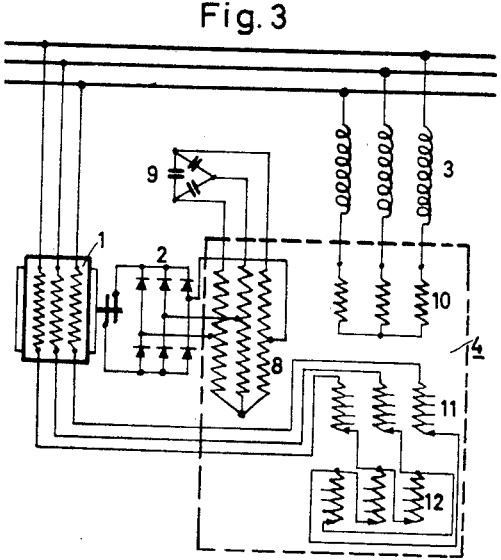
Figure 2:
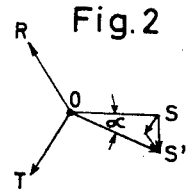
Figure 4:
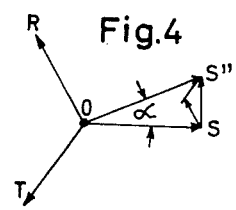
Figure 5:
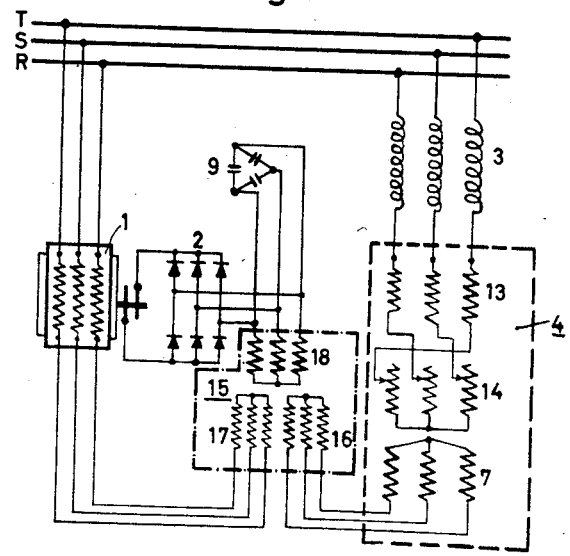

The foregoing and more specific features of my invention will be apparent from the following description in conjunction with the embodiments exemplified by the drawing in which Fig. 1 shows the basic circuit diagram of a multiphase field excitation system according to the invention; Fig. 2 is a vector diagram explanatory of the operation of the same system; Fig. 3 shows a modification of the system of Fig. 1; Fig. 4 is a vector diagram explanatory of the system of Fig. 3; and Fig. 5 shows still another modification wherein the current transformer illustrated in Figs. 1 and 3 is substituted by two transformers of which one energizes the other. The same reference numerals are used in Figs. 1, 3 and 5 for denoting similar elements respectively.

Referring to Fig. 1, a synchronous machine 1 is connected to a multiphase line R, S, T. Excitation current is supplied to the machine through slip rings from a rectifier 2 which, for instance and as shown, may comprise dry rectifiers in bridge connection. The A.-C. input terminals of the rectifier are connected with the secondary windings 8 of a transformer 4. The transformer has two groups of primary windings, namely a three-phase group 7 and another three-phase group comprising two component sets 5 and 6. The primary group 7 is connected in series with the stator winding of the synchronous machine and hence is excited by the load current of the machine. The primary windings 5 and 6 are connected to the line in series with a three-phase reactor 3 and supply the component excitation current independent of the load. To minimize mutual influence of the load-dependent and load-independent excitation-current components in transformer 4, the reactive impedance of reactors 3 is made large with respect to the reactance of the transformer 4. For securing a phase angle different from 90° between the resultant excitation ampere turns jointly produced by the primary windings 5 and 6 as compared with the terminal voltage of the machine, the excitation windings 5 and 6 are not in phase with each other but are so connected in series that their ampere turns are displaced 90° with respect to each other. This series connection in Fig. 1 is such that the windings 5 are arranged in open or through connection, while the windings 6 are delta connected. The series connections between the two groups of windings are cyclically displaced, and the windings 5 and 6 have selective taps so that the mutually perpendicular components of the ampere turns can be independently selected or adjusted relative to each other.

The phase-shifting performance of the two sets of voltage-responsively energized windings 5 and 6 on the primary side of the transformer 4 will be more fully understood from the following. Assume that a field-excitation system otherwise corresponding to Fig. 1 is equipped with only one set of voltage-responsive primary windings instead of the two winding sets 5, 6, and that this single three-phase primary is star connected. Then the voltage-responsive component of transformer excitation in each individual winding has a fixed phase relation to the terminal voltage, this excitation being represented in the diagram of Fig. 2 by the vectors O—R, O—S, O—T. However, since according to the invention two series-connected sets of windings 5 and 6 are used that produce two excitation components perpendicularly directed to each other, and since each of these components is independently adjustable, the resultant excitation supplied by the phase voltage O—S assumes the vectorial value O—S'. This voltage-dependent excitation component O—S' lags the single-winding excitation O—S by an angle $\alpha$. Referring again to the assumption that a single three-phase winding is used, the excitation ampere turns of this winding, due to its series connection with the inductive reactor 3, would be about 90° phase displaced relative to the terminal voltage of the machine, while the corresponding excitation (O—S') in the system according to Fig. 1 has a larger phase displacement of a magnitude depending upon the selected setting of the taps of the respective windings 5 and 6.

The system shown in Fig. 1 is equipped with a set of capacitors 9 which are tuned to resonance with the reactor coils 3 at a given speed, for instance the rated speed, of the machine. This capacitor connection serves to provide for self-excitation of the synchronous machine by its residual magnetism.

In the system according to Fig. 3, the transformer 4 for energizing the rectifier 3 has a single group of voltage-dependent primaries 10, while its group of current-dependent primaries is divided into two sets 11 and 12. The connection of the windings 10 through the reactor 3 to the line 1 is a conventional star connection. The windings 11 and 12, excited by the load current of the machine, are series connected, and windings 12 are arranged in delta. The connection of the secondary winding 8 which energizes the rectifier for exciting the synchronous machine and the circuit connections of the capacitors 9 correspond to Fig. 1. In Fig. 3 the cyclical series connections between the delta-connected excitation windings 12 and the windings 11 is in the opposite sense as compared with Fig. 1. This has the result that, according to the vector diagram of Fig. 4, the resultant voltage-dependent ampere turns of excitation O—S" is phase displaced a leading angle α relative to the excitation O—S so that, in contrast to the conditions of Fig. 2, the phase angle between the voltage-dependent excitation and the terminal voltage is smaller than 90°.

In the system shown in Fig. 5, the superposition of the load-independent and load-dependent excitation components is accomplished with two transformers 4 and 15. The transformer 15 has a secondary winding 18 which energizes the excitation winding of the synchronous machine 1 through the rectifier 2 in the same way as in Figs. 1 and 3. The transformer 15 has two three phase primary windings 16 and 17. The primary winding 17 is excited by the load current of the synchronous machine. The primary winding 16, which induces in the secondary winding 18 a current in superposition with that induced by the primary winding 17, is connected to the secondary winding 7 of the transformer 4. The primary winding of transformer 4 is divided into two sets 13 and 14, which are interconnected, in three-phase zigzag connection, through reactors 3 to the line voltage of the synchronous machine. The primary windings 14, as illustrated, are regulatable by means of winding taps so that the ratio of the respective voltages applied to the two sets of windings 13 and 14 can be adjusted to a given value and thus to a desired phase displacement of the current delivered by the secondary winding 7. The zigzag connection of the windings 13 and 14 permits obtaining the described departure from 90° of the phase angle between the voltage-dependent ampere turns of excitation and the terminal voltage of the machine, thus also affording the desired regulation for constancy of the synchronous-machine voltage regardless of changes in power factor of the load current.

It will be obvious to those skilled in the art that in systems according to the invention various additions or modifications can be made so as to result in specific embodiments other than those described and illustrated, without departing from the essential features of my invention and within the scope of the claims annexed hereto.

I claim:

1. With a synchronous multiphase machine having a multiphase terminal-voltage line and having direct-current field means, the combination of a voltage regulating system comprising a rectifier, transformer means having a secondary winding connected through said rectifier with said field means to supply excitation thereto, said transformer means having two multiphase groups of primary windings for energizing said transfer by superimposed respective currents dependent upon the load current and the terminal voltage respectively of the machine, one of said groups being series connected with the machine to provide load-dependent energization, the other group having a reactive impedance circuit connected across said line to provide voltage-dependent energization, and one of said groups having a multiphase interconnection of its windings different from the multiphase interconnection in the other group, whereby the resultant energization of said transformer means has a phase angle different from 90 electrical degrees relative to the terminal voltage, for maintaining constant terminal voltage at different power factors of the machine.

2. With a synchronous multiphase machine having a multiphase terminal-voltage line and having direct-current field means, the combination of a voltage regulating system comprising a rectifier, transformer means having a secondary winding connected through said rectifier with said field means to supply excitation thereto, said transformer means having two multiphase groups of primary windings for energizing said transformer by superimposed respective currents dependent upon the load current and the terminal voltage respectively of the machine, one of said groups being series connected with the machine to provide load-dependent energization, the other group being connected across said line to provide voltage-dependent energization, one of said two groups having two sets of multiphase windings and a phase-shift interconnection between said two sets, whereby the ampere turns of one set are phase displaced a given electrical angle relative to those of said other set.

3. With a synchronous multiphase machine having a multiphase terminal-voltage line and having direct-current field means, the combination of a voltage regulating system comprising a rectifier, transformer means having a secondary winding connected through said rectifier with said field means to supply excitation thereto, said transformer means having two multiphase groups of primary windings for energizing said transformer by superimposed respective currents dependent upon the load current and the terminal voltage respectively of the machine, one of said groups being series connected with the machine to provide load-dependent energization, the other group being connected across said line to provide voltage-dependent energization, one of said two groups having two sets of multiphase windings series connected with each other and having respective ampere turns phase displaced 90 electrical degrees relative to each other.

4. With a synchronous multiphase machine having a multiphase terminal-voltage line and having direct-current field means, the combination of a voltage regulating system comprising a rectifier, transformer means having a secondary winding connected through said rectifier with said field means to supply excitation thereto, said transformer means having two multiphase groups of primary windings for energizing said transformer by superimposed respective currents dependent upon the load current and the terminal voltage respectively of the machine, one of said groups being series connected with the machine to provide load-dependent energization, the other group being connected across said line to provide voltage-dependent energization, one of said two groups having two sets of multiphase windings and a multiphase phase-shift interconnection of said two sets, said sets having means for controlling their effective number of winding turns to permit setting the ampere turns of said two sets to a given phase displacement relative to each other.

5. With a synchronous multiphase machine having a multiphase terminal-voltage line and having direct-current field means, the combination of a voltage regulating system comprising a rectifier, transformer means having a secondary winding connected through said rectifier with said field means to supply excitation thereto, said transformer means having two multiphase groups of primary windings for energizing said transformer by superimposed respective currents dependent upon the load current and the terminal voltage respectively of the machine, one of said groups being series connected with the machine to provide load-dependent energization, the other group being connected across said line to provide voltage-dependent energization, one of said two groups having its windings interconnected in Y-relation, the other group having two multiphase sets of windings, one of said sets having its individual windings interconnected in delta relation, said other set having its windings series connected between said line and the respective windings of said one set in cyclically exchanged relation to said latter windings.

6. With a synchronous multiphase machine having a multiphase terminal-voltage line and having direct-current field means, the combination of a voltage regulating system comprising a rectifier, transformer means having a secondary winding connected through said rectifier with said field means to supply excitation thereto, said transformer means having two multiphase groups of primary windings for energizing said transformer by superimposed respective currents dependent upon the load current and the terminal voltage respectively of the machine, one of said groups being series connected with the machine to provide load-dependent energization, the other group being connected across said line to provide voltage-dependent energization, one of said two groups having two multiphase sets of windings, one of said sets having its individual windings zig-zag connected, and the other set having its windings series connected between said one set and the line in cyclically exchanged relation to said windings of said one set so that the currents flowing in said two sets are 90 electrical degrees phase displaced relative to each other.

7. Apparatus for regulating a multiphase synchronous dynamoelectric machine having a field winding and a terminal voltage line, comprising a multiphase transformer having a plurality of multiphase primary windings and a multiphase secondary winding, a multiphase rectifier, said secondary winding being connected with the field winding through said rectifier, means for exciting a first one of said plurality of multiphase primary windings with current proportional to the load current of the machine, a circuit connected with the line for energizing a second and a third one of said multiphase windings from the terminal line voltage, said circuit including a multiphase reactive impedance device for shifting the phase of the current fed to said second and third multiphase windings by approximately 90 electrical degrees relative to the line voltage, and a phase-shift connection joining said second and third multiphase windings in said circuit so that their resultant ampere turns are shifted less than 90 electrical degrees with respect to the line voltage.

8. Apparatus for supplying excitation current to the field winding of a multiphase synchronous machine, comprising a multiphase transformer having a secondary circuit and two primary circuits, a rectifier, the field winding of the machine being energized from said secondary circuit of said transformer through said rectifier, a phase-shifting impedance device, means connecting one of said primary circuits through said device with the multiphase output voltage of the machine to provide said transformer with voltage-responsive energization, said other primary circuit being series connected with the machine to provide load-dependent excitation, said primary circuit comprising two sets of windings and phase-shift connection means interconnecting said two sets so that their ampere turns are displaced a definite electrical angle with respect to each other.

9. Apparatus for supplying excitation current to the field winding of a multiphase synchronous machine, comprising a multiphase transformer having two primary circuits and a secondary circuit, a rectifier, the field winding of the machine being energized from the secondary circuit of said transformer through said rectifier, means for supplying one of said primary circuits of said transformer with multiphase current proportional to the load current of the machine, a phase-shifting impedance device, said other primary circuit being connected through said impedance device with the multi-phase output voltage of the machine, said other primary circuit comprising two sets of windings, phase-shift connection means interconnecting said sets of windings so that their ampere turns are shifted by a definite electrical angle with respect to each other.

10. Apparatus for supplying excitation current to the field winding of a multiphase synchronous machine, comprising a multiphase transformer having primary circuits and a secondary circuit, a rectifier, the field winding of the machine being energized from the secondary circuit of said transformer through said rectifier, a phase-shifting impedance device, means for supplying the primary circuits of said transformer with superimposed multiphase currents of which one is proportional to the load current of the synchronous machine, and the other is supplied through said impedance device from the multiphase output voltage of the machine, said primary circuits comprising two sets of windings, said windings each being adjustable with respect to the their number of turns, means adjustably interconnecting said windings so that their ampere turns are shifted by a definite electrical angle with respect to each other, said windings being energized by said load-proportional current.

11. Apparatus for supplying excitation current to a multiphase synchronous machine, comprising a multiphase transformer having primary circuits and a secondary circuit, a rectifier, the field winding of the machine being energized from the secondary circuit of said transformer through said rectifier, a phase-shifting impedance device, means for supplying one of said primary circuits with multiphase current proportional to the load current of the machine, said other primary circuits being supplied through said impedance device from the multiphase output voltage of the machine, said other primary circuit comprising two sets of windings, each of said windings being adjustable with respect to its number of turns, means adjustably interconnecting said sets of windings so that their ampere turns are shifted by a definite electrical angle with respect to each other.

12. Apparatus for supplying excitation current to a multiphase synchronous machine, comprising a multiphase transformer having two primary circuits and a secondary circuit, a rectifier, the field winding of the machine being energized from the secondary circuit of said transformer through said rectifier, a phase-shifting impedance device, means for supplying the primary circuits of said transformer with superimposed multiphase currents of which one is proportional to the load current of the synchronous machine and the other is supplied over said impedance device from the multiphase output voltage of the machine, one of said primary circuits comprising two sets of windings, one of said sets of windings being open-connected and the other delta-connected, the individual phase windings of said two sets being so sequentially interconnected in series that current flowing through said windings is displaced by an electrical angle of substantially 90°, said partial windings being energized by said load-proportional current.

13. Apparatus for supplying excitation current to a multiphase synchronous machine, comprising a multiphase transformer having two primary circuits and a secondary circuit, a rectifier, the field winding of the machine being energized from the secondary circuit of said transformer through said rectifier, a phase-shifting impedance device, means for supplying the primary circuits of said transformer with superimposed multiphase currents of which one is proportional to the load current of the synchronous machine and the other is supplied over said impedance device from the multiphase output voltage of the machine, one of said primary circuits comprising two sets of windings, one of said sets of windings being open-connected and the other delta-connected, the individual windings of said two sets being so sequentially interconnected in series that current flowing through said sets of windings is displaced by an electrical angle of substantially 90°, said sets of windings being energized by said output voltage of the machine.

14. Apparatus for supplying excitation current to a multiphase synchronous machine, comprising a multiphase transformer having a primary circuit and a secondary circuit, a rectifier, the field winding of the machine being energized from the secondary circuit of said transformer through said rectifier, a phase-shifting impedance device, means for supplying the primary circuit of said transformer with superimposed multiphase currents of which one is proportional to the load current of the synchronous machine and the other is supplied over said impedance device from the multiphase output voltage of the machine, said primary circuit comprising two partial windings, one of said partial windings being open-connected and the other zigzag-connected, the individual phase windings of said partial windings being so sequentially connected in series that current flowing through said partial windings is mutually displaced by an electrical angle of 90°, said partial windings being energized by said load-proportional current.

15. Apparatus for regulating a multiphase synchronous dynamoelectric machine having a field winding and a terminal voltage line comprising a first multiphase field excitation transformer having two multiphase primary windings and a multiphase secondary winding, a multiphase rectifier, said secondary winding being connected with the field winding through said rectifier, means for exciting one of said primary windings with current proportional to the load current through said machine, means for exciting the other of said primary windings with current fed from the terminal line voltage, said line voltage exciting means comprising an intermediate transformer having a pair of multiphase primary windings and a multiphase secondary winding, the multiphase secondary winding of said intermediate transformer being connected with the other of said primary windings of said excitation transformer, said line voltage exciting means further comprising a multiphase impedance device for shifting the phase of the line current fed to said pair of multiphase primary windings of said intermediate transformer by approximately 90 electrical degrees, and means interconnecting said pair of multiphase primary windings of said intermediate transformer so that the resultant current in their ampere turns is shifted by an electical angle less than 90 electrical degrees with respect to the current fed by said impedance device.

References Cited in the file of this patent
UNITED STATES PATENTS
2,569,302   Forssell _____ Sept. 25, 1951